3,070,580
CRYSTALLINE POLY(METHYLENE SULFIDE)
AND PROCESS FOR ITS PREPARATION
Jesse Harmon, Hockessin, Del., assignor to E. I. du Pont de Nemours and Company, Wilmington, Del., a corporation of Delaware
No Drawing. Filed July 16, 1959, Ser. No. 827,449
7 Claims. (Cl. 260—79)

This invention relates to new compositions of matter and to their preparation, and more particularly it relates to poly(methylene sulfide) and its preparation.

Solid resinous products are obtained by saturating 37% aqueous formaldehyde with hydrogen sulfide at 40° to 50° C. A product obtained in this way has been described as melting at 80° C. and containing 51.5% sulfur. If instead of using hydrogen sulfide an alkali metal sulfide or polysulfide is used, the products are then said to be "poly(methylene sulfides)." These polymers are described on page 190 in J. F. Walker's "Formaldehyde," second edition, Reinhold Publishing Corp., New York (1953), as ranging from hard, brittle solids to elastomers and are said to conform to:

and

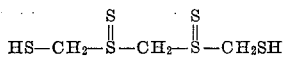

The product from formaldehyde and sodium sulfide is a colorless amorphous powder, which becomes plastic and rubbery on heating and is insoluble in organic solvents. The elastomeric products corresponding to $(-CH_2-S_2-)_x$ are said to harden, become brittle, and lose sulfur on storage. From formaldehyde and a sodium polysulfide corresponding to the tetra or pentasulfide, rubberlike materials which show little or no change on storage are said to be obtained. A high molecular weight polymethylene sulfide is said to be obtained from hydrogen sulfide and hexamethylenetetramine. However, from this reaction the only products which have been obtained are said to be mixtures of trithiane and materials containing nitrogen.

In none of the above work has a high molecular weight thermoplastic, stable, high-melting poly(methylene sulfide) been described. This invention for the first time describes such a product and provides methods for preparing it.

It is an object of this invention to provide a thermoplastic, high molecular weight, stable poly(methylene sulfide) showing very high crystallinity by X-ray analysis. It is still another object of this invention to provide a stable, thermoplastic crystalline poly(methylene sulfide) having a melting point of at least 220° C. It is a further object of this invention to provide fibers, films, and other shaped articles of a thermoplastic, high melting poly(methylene sulfide). Other objects will become apparent from the more detailed explanation of this invention.

The above objects are accomplished by self-condensing methanedithiol, $CH_2(SH)_2$, or mercaptomethyl sulfide, $HSCH_2SCH_2SH$, in the presence of a basic material at 25° to 250° C., and maintaining these conditions until essentially no more hydrogen sulfide is evolved from the reaction mixture.

In a convenient method for preparing the poly(methylene sulfides) of this invention, a reactor is charged with methanedithiol or mercaptomethyl sulfide. The reactor is swept with nitrogen and there is added at ambient temperature (ca. 25° C.) under nitrogen from 0.05% to 15% of a basic catalyst, e.g., ammonia or a trialkylamine, based on the weight of the methanedithiol or mercaptomethyl sulfide. After effervescence, due to the liberation of hydrogen sulfide, has subsided, the solution is heated gradually to between 140° and 200° C. and held at this temperature until essentially no more hydrogen sulfide continues to be released which, depending upon temperature and catalyst used, may require from 15 minutes to 30 hours. The reaction mixture is allowed to cool and the reactor is opened. The reaction mixture is extracted with a suitable solvent, e.g., chloroform or benzene, then with hot water, and dried under vacuum. The resulting product, which generally melts above 220°, may be treated with a strong mineral acid, e.g., aqueous hydrochloric acid at 90° to 100° C. After removal of acid, the polymer is heated in the solid state in the presence of an alkaline material such as ammonia, at temperatures approaching the melting point for several hours. The polymer produced thereby generally melts above 240° C., shows a very high degree of crystallinity, and is readily melt-spinnable.

The acid-treatment step is unnecessary in certain cases where the entire procedure has been carried out in a completely inert atmosphere.

The product of this process is a thermoplastic, high molecular weight, crystalline poly(methylene sulfide) characterized by being fiber-forming, by having strong X-ray diffraction lines corresponding to interplanar spacings of 4.370 to 4.43 angstrom units, 2.985 to 3.015 angstrom units, and 2.17 angstrom units, and by having a melting point of at least 220° C.

The examples which follow illustrate but do not limit this invention. The X-ray diffraction data were obtained using the Debye-Scherrer powder method with a North American Philips unit, employing copper K alpha-radiation filtered through nickel to give an effective wave length of 1.542 angstrom units. In this method the sample is finely ground and packed into a capillary tube, which is mounted in a camera having a 114.9 mm. diameter. The method of determining melting points on a copper block is described in the first full paragraph of Ellis, "The Chemistry of Synthetic Resins," volume II, page 1264, Reinhold Publishing Corporation, New York, N.Y. (1935).

*Example I*

A 40 x 200 mm. glass reactor fitted with a thermometer, ebullator, and vent was purged of air with oxygen-free nitrogen and charged with 8 g. of methanedithiol and 42 g. of tetramethylene sulfone. Anhydrous ammonia was slowly passed through the ebullator tube. The solution was maintained at 27° to 32° C. for one hour, during which time hydrogen sulfide was detected in the vent gases and a white precipitate formed in the liquid. The temperature was then gradually raised to 154° C. during two hours and held at 154° to 167° C. for another two hours. The mixture effervesced hydrogen sulfide vigorously during the first part of the heating cycle. A slow stream of ammonia was continuously passed through the solution throughout the four hours of reaction. The precipitate of ammonium hydrosulfide disappeared and then a precipitate of polymer appeared, starting when the temperature reached 82° C. and gradually increasing in amount on further heating until the reaction mixture became a thick slurry. After cooling, 100 cc. of chloroform was added and the mixture was stirred with heating to disperse the polymer. The slurry was filtered, and the polymer was washed with hot chloroform, and stirred in hot water over a steam bath for two hours to remove tetramethylene sulfone. The polymer was then filtered, washed with hot water, and dried in a vacuum oven at 75° C. The yield of polymer was 4.5 g. [98% of the theoretical for $(CH_2S)_x$] of a finely divided, white solid which was highly crystalline, as determined by X-ray diffraction, and had an X-ray melting point determined in a vacuum between 220° and 224° C. The polymer melted at 220° C. on a copper melting point block and coalesced to a thick sticky mass at 230° C. Fine threads were drawn from the molten polymer at 235° to 240° C., and hence it is useful as a fiber-forming polymer.

Films were molded from the polymer, and whether they were quenched or remained unquenched subsequent to the molding, the resulting films were translucent. The polymer was also found to be useful as a protective coating for rigid substrates.

*Example II*

The procedure of Example I was followed, except that 0.25 g. pentamethylenediethylenetriamine was used as a catalyst, instead of anhydrous ammonia, and at the end of the polymerization cycle the system was maintained at 150° C. under reduced pressure (10 mm. mercury) for 30 minutes. The product was a white powder weighing 4.5 g. and melting at 220° C. It was soluble in tetramethylene sulfone at 195° C. and above. A flat plate-type X-ray pattern showed two sharp lines at 4.370 angstrom units and 2.985 angstrom units, indicating crystallinity. The infrared spectrum showed strong absorption at 3.4 microns and at 14.85 microns indicating C—H and C—S bonds respectively. This polymer is remarkably heat-stable, showing no weight loss when heated 2.5 hours at 160° C. and only a 4% weight loss after four hours at 200° C.

*Example III*

Five grams of the poly(methylene sulfide), prepared in the manner of Example I, was placed in 224 g. of concentrated hydrochloric acid, and the mixture heated in a steam bath for four hours. Under an inert atmosphere the polymer was recovered by filtration, washed with distilled water, and dried at 70° C. in a vacuum oven for one day. It was then transferred under nitrogen to a 40 x 200 mm. glass tube equipped with an ebullator and a vent. The poly(methylene sulfide) was heated in a bath at 218° C. over a period of 30 minutes in a nitrogen atmosphere. At this point, anhydrous ammonia was passed slowly through the ebullator tube as heating was continued at 218° to 221° C. for 100 minutes. Hydrogen sulfide was evolved during this period. There was obtained 4.5 g. of polymer melting at 248° C. to a very viscous melt from which fibers could be melt-spun having greatly increased flexibility in comparison with the fibers of the polymer that had not been treated with hydrochloric acid and heat. The high melting polymer gave an X-ray pattern with strong lines at 4.43, 3.015, and 2.17 angstrom units.

*Example IV*

One hundred twenty grams of methanedithiol was heated in a 500 ml. 3-necked flask equipped with stirrer, gas entrance and exit tubes, and a reflux condenser. Ammonia gas was bubbled in slowly, and after 20 minutes at 84° to 100° C., 100 g. of tetramethylene sulfone was added. A vigorous evolution of hydrogen sulfide occurred. Stirring and ammonia addition were continued at 100° to 118° C. for five hours. The temperature was then raised to 125° to 164° C. and held in this range for six hours. The reaction mixture, which consisted of a thick slurry, was filtered under a nitrogen atmosphere, washed with hot anhydrous benzene, and allowed to stand in benzene. It was filtered again under nitrogen and vacuum-dried one day at 70° C. There was obtained 51 g. of a white polymer melting at 222° C. on a copper block. One gram of this polymer was transferred, under nitrogen, to a 40 mm. x 200 mm. glass reactor fitted with an ebullator tube and an exit tube. Heat was applied as nitrogen was passed slowly through until a bath temperature of 205° C. was reached, whereupon ammonia was passed slowly through and heating continued at 216° to 219° C. for 4.5 hours. The polymer recovered melted at 242° to 244° C. on a copper block, was a rubbery melt at 247° C. Flexible filaments were melt-spun at 250° to 260° C. A film pressed at 245° C. was very glossy and translucent.

*Example V*

Thirty grams of methanedithiol was placed in a 40 mm. x 200 mm. glass reactor fitted with an ebullator and a gas exit tube. There was then added 0.7 grams of tri-n-amylamine under a nitrogen blanket. Upon addition of the tri-n-amylamine hydrogen sulfide began to be evolved. The reactor was heated gradually to 112° C. over a 20-minute period and was held at 109° to 123° C. for 30 minutes, at which point the charge was a solid. The bath temperature was then gradually raised to 230° C. over a period of 3 hours. There was obtained, after benzene extraction to remove any low molecular weight compounds, 14.7 g. (75%) of melt-spinnable, white poly(methylene sulfide) melting at 230° C. on a copper block.

*Example VI*

Four grams of methanedithiol and 0.1 g. of triphenylphosphine were placed in an elongated glass tube closed at one end. After the triphenylphosphine had dissolved, the bottom tip of the tube was warmed momentarily in a 140° C. oil bath. Strong effervescence of hydrogen sulfide took place for about five minutes. The tube was then lowered gradually into the 140° C. oil bath. During a period of a few minutes the liquid first changed to a waxlike solid, then melted and finally resolidified. Hydrogen sulfide was liberated during this process. After the system had been heated about 15 minutes a 20-30 mm. vacuum was applied and heating at 140° to 145° C. was continued for 30 minutes. The product, after cooling, was a slightly yellow, hard, brittle solid weighing 2.5 g. and melting on a copper melting point block at 225° C. It was soluble in tetramethylene sulfone at 200° C. but was insoluble in hot dioxane.

The polymerization process of this invention is carried out in the presence of a basic catalyst. "Basic catalyst" refers to compounds having pH values in excess of 7. Particularly useful catalysts are the trivalent and pentavalent compounds of the group V-A elements, i.e., nitrogen, phosphorus, arsenic, antimony, and bismuth, and the alkali metal oxides, hydroxides, carbonates, and sulfites. Examples of such compounds are triethylamine, ammonia, methylamine, diethylamine, n-hexylamine, tri-n-hexylamine, pyridine, piperidine, pentamethylenediethylenetriamine, tributylamine, hydrazine, dimethyformamide, dimethylacetamide, triphenylphosphine, triphenylarsine, triphenylstibine, sodium hydroxide, sodium bicarbonate, sodium carbonate, sodium sulfite, and the like.

The use of a reaction medium is not necessary. However, the process can also be carried out conveniently in aqueous or non-aqueous dispersions, or in a solvent for the monomer. Suitable media are tetramethylene sulfone, dimethylacetamide, nitromethane, dimethylformamide, mineral oil, and the like.

The amount of reaction medium, when it is used, is not critical, and it can equal or exceed by many fold the amount of methanedithiol or mercaptomethyl sulfide.

The catalyst can be added to the solution of the methanedithiol or mercaptomethyl sulfide at ordinary temperatures (ca. 25° C.). Alternatively, the catalyst can be added continuously or in small portions throughout the reaction period. The latter is the preferred procedure when a normally gaseous catalyst, e.g., ammonia, is used.

In the aspect wherein the catalyst is added to the initial charge, the amount used, based on the weight of methanedithiol or mercaptomethyl sulfide charged, is dependent on the pH of the catalyst used, but is at least 0.05%. Generally, however, the amount is in the range of 1% to 5% because within this range the best balance of product yield with good reaction rate is realized.

The reaction pressure is autogenetically produced, but for the best results it is reduced gradually to accelerate the removal of the hydrogen sulfide. At the point where hydrogen sulfide essentially ceases to be liberated, the polymerization reaction is usually complete.

Example III shows after-treatment of the polymer with hydrochloric acid. It is believed that this treatment may remove certain non-thiol end groups. Subsequent treatment of the polymer by a catalyzed powder-polymerization technique completes the polymerization. Other non-oxidizing mineral acids can be used in place of hydrochloric, e.g., hydrobromic, and the like. This subsequent polymerization markedly increases melting point and constitutes a preferred process embodiment of this invention.

The treatment with the mineral acid is generally carried out at a temperature which is not above 100° C.

The amount of mineral acid employed is not critical and it can equal or exceed the poly(methylene sulfide) by many fold.

The temperature at which the acid-treated poly(methylene sulfide) is heated is in the range of 100° to 250° C. and the heat-treatment is continued until hydrogen sulfide ceases to be evolved.

The heat-treatment of the acid-treated polymer is usually carried on in the presence of an alkaline catalyst, i.e., a material which has a pH in excess of 7 of the kind used in the initial polymerization.

The amount of catalyst used is in the range of 0.05 to 15% based on the weight of the poly(methylene sulfide). Usually, however, the catalyst concentration is in the range of 0.2 to 10% by weight of the poly(methylene sulfides).

The poly(methylene sulfides) produced in accord with the process of this invention are fundamentally different from the product obtained from hexamethylenetetramine and hydrogen sulfide, as shown below.

A one-liter stainless steel rocker reactor was purged of air with oxygen-free nitrogen and charged with 140 g. of hexamethylenetetramine, 300 cc. of water, and 306 g. of liquid hydrogen sulfide. The reactor was closed and heated with agitation at 50° to 55° C. for eight hours, then at 75° C. for five hours. The product was a white, chalklike solid. It was thoroughly washed with hot water and dried in a vacuum at 70° C. The weight of dried product obtained was 270 g., which corresponded to a 98% yield of poly(methylene sulfide), based on the hexamethylenetetramine charged to the reactor. The product became plastic at 110° C. on a copper block, melted at 145° C., and gave a thin clear melt at 155° C. It was slightly soluble in hot 1.25% aqueous sodium hydroxide, and completely soluble in hot tetramethylene sulfone.

*Analysis.*—Calcd. for $(CH_2S)_x$: C, 26.1; H, 4.35; S, 69.55. Found: C, 25.28; H, 4.79; S, 68.24, 68.33; N, 1.55.

The poly(methylene sulfides) of this invention are highly thermally stable and have X-ray melting points which are in excess of 220° C. The polymers which melt above 240° C. can be drawn into flexible filaments or fibers by melt spinning, spinning from solution, or by melt extrusion. The fibers thus obtained may be converted into bats, felts, and the like, which, in turn, are useful in soundproofing, insulation, cushioning, and like applications. The poly(methylene sulfides) are also useful for conversion to rods, tubes, pipes, films, sheets, and other shaped articles by extrusion, injection-molding, and compression-molding.

I claim:
1. As a composition of matter, a normally solid, thermoplastic, crystalline, fiber-forming poly(methylene sulfide) having the structure consisting essentially of recurring —$CH_2S$— units and having a melting point of at least 220° C.

2. As a composition of matter a normally solid, thermoplastic, fiber-forming poly(methylene sulfide) having the structure consisting essentially of recurring —$CH_2S$— units and characterized by having a melting point of at least 240° C., as determined by the copper block melting point method.

3. A shaped article comprising a normally solid, thermoplastic, crystalline, fiber-forming poly(methylene sulfide) having the structure consisting essentially of recurring —$CH_2S$— units and having a melting point of at least 220° C.

4. The shaped article of claim 3 in which said article is a fiber.

5. The shaped article of claim 3 in which said article is a film.

6. A process for the preparation of a normally solid, thermoplastic, crystalline, fiber-forming poly(methylene sulfide) having the structure consisting essentially of recurring —$CH_2S$— units comprising condensing a compound from the group consisting of methanedithiol and mercapto-methyl sulfide at a temperature of 25° to 250° C. in an inert atmosphere in contact with a catalyst having a pH above 7, removing substantially all of the hydrogen sulfide formed by the condensation, and recovering a normally solid, thermoplastic, crystalline, fiber-forming poly(methylene sulfide) having the structure consisting essentially of recurring —$CH_2S$— units.

7. A process for the preparation of a normally solid, thermoplastic, crystalline, fiber-forming poly(methylene sulfide) having the structure consisting essentially of recurring —$CH_2S$— units comprising condensing a compound from the group consisting of methanedithiol and mercaptomethyl sulfide at a temperature of 25° to 250° C. in contact with a catalyst having a pH above 7, removing substantially all of the hydrogen sulfide formed, recovering the normally solid high molecular weight, crystalline poly(methylene sulfide) formed, treating the said solid, crystalline poly(methylene sulfide) with a mineral acid at a temperature of 90°–100° C., removing the treated polymer, washing, and drying, and then heating the treated polymer at a temperature in excess of 100° C. in the presence of an alkaline catalyst until hydrogen sulfide ceases to be evolved, and recovering a normally solid, thermoplastic, crystalline, fiber-forming poly(methylene sulfide) having the structure consisting essentially of recurring —$CH_2S$— units.

References Cited in the file of this patent

FOREIGN PATENTS 480,360    Canada _____ Jan. 22, 1952

OTHER REFERENCES

Journal American Chemical Society, 74, 1952 pages 3982–3989.

UNITED STATES PATENT OFFICE

CERTIFICATE OF CORRECTION

Patent No. 3,070,580                          December 25, 1962

Jesse Harmon

It is hereby certified that error appears in the above numbered patent requiring correction and that the said Letters Patent should read as corrected below.

Column 1, lines 24 to 28, the formulas should appear as shown below instead of as in the patent:

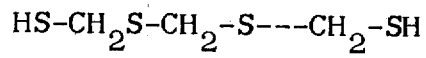

and

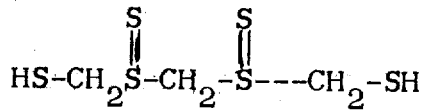

Signed and sealed this 16th day of July 1963.

(SEAL)
Attest:

ERNEST W. SWIDER                               DAVID L. LADD
Attesting Officer                                   Commissioner of Patents